Oct. 5, 1937.  E. J. H. LEININGER  2,094,711
METER REGISTER ATTACHMENT
Filed April 22, 1937
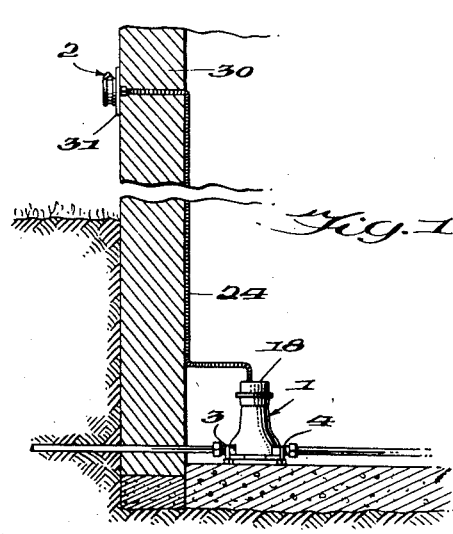
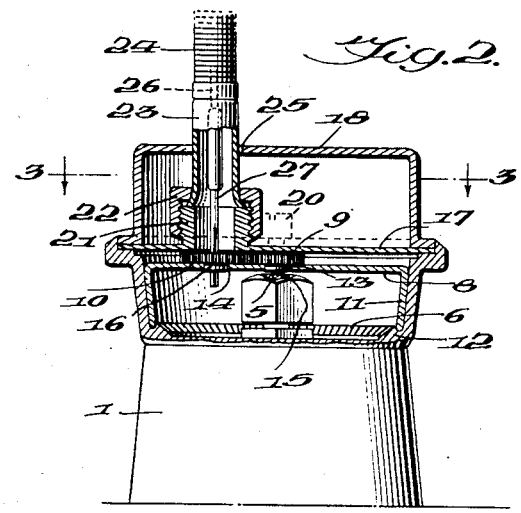
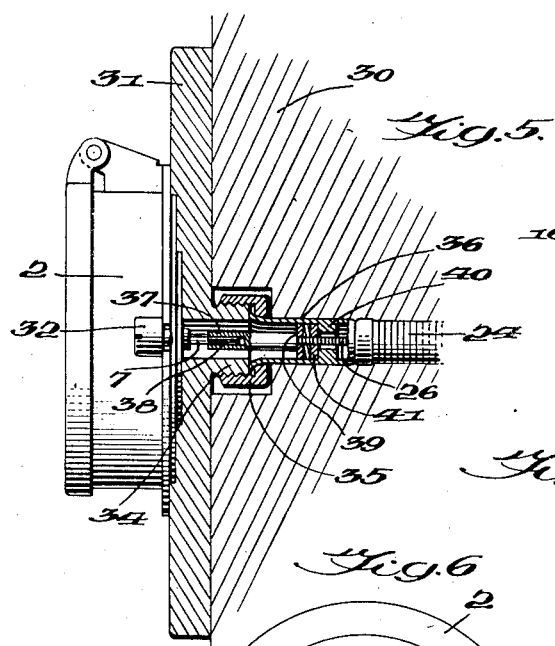
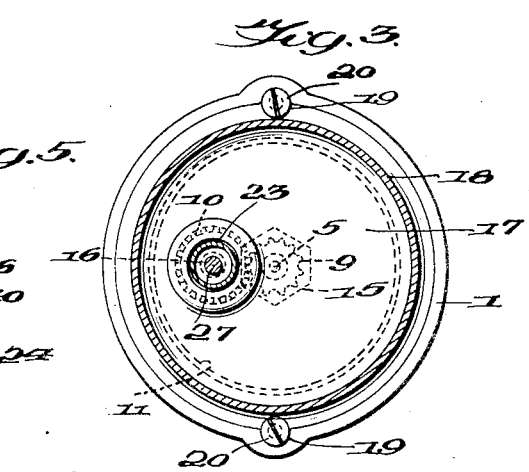
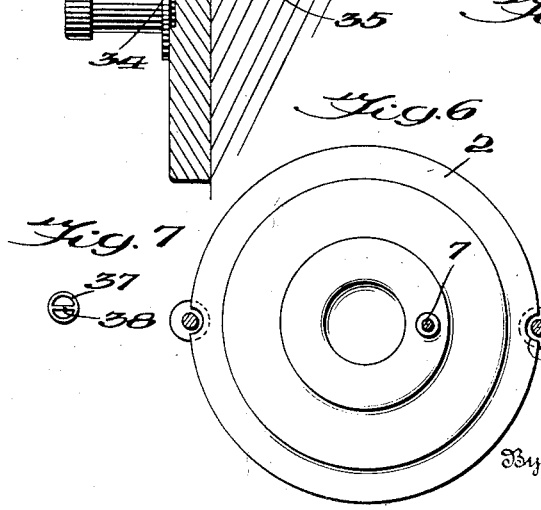
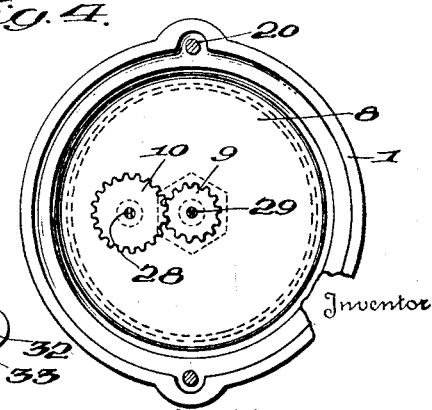
Inventor
Edwin J. H. Leininger,
By John E. Eastlack, Attorney Patented Oct. 5, 1937

2,094,711

UNITED STATES PATENT OFFICE 2,094,711

METER REGISTER ATTACHMENT

Edwin J. H. Leininger, Ames, Iowa, assignor of one-half to Ira J. Scott, Ames, Iowa Application April 22, 1937, Serial No. 138,471

5 Claims. (Cl. 73—272)

This invention relates to an attachment for water meters whereby the meter motor and meter register may be separated and arbitrarily located with respect to each other.

In the customary installation of water meters, either the meter is placed within the basement or other portion of a house or the like, or outside of the house in close proximity thereto. If placed within the house, it is necessary for the meter reader to enter the house at intervals for the purpose of reading the meter, and if placed outside the house, it must be sunk in the ground below the frost line or otherwise protected from freezing temperatures in order to perform its intended function.

The inside installation is objectionable on the part of householders on account of the necessity of admitting the meter reader into the house every time the meter is read, and is equally objectionable on the part of the meter reader on account of the necessity of seeking admittance every time he wishes to read the meter, and of the frequent impossibility of gaining such admittance due to temporary absence of the householder, often requiring extra trips, and sometimes requiring the making of a special appointment before he can gain access to the meter to read the same.

These objections are eliminated by an outside installation, but only at considerable expense due to the precautions necessary to protect the meter from freezing weather and the like. In addition to the expense, it is usually necessary to dig up the householder's lawn in order to make the installation, and accessibility to the register is necessarily hindered to some extent due to the type of installation necessary to protect the meter.

The primary object of the present invention is to eliminate all of the foregoing objections at a very small expense by the provision of means whereby the meter proper including the meter motor may be located inside of a house at any desired point without regard for the readiness of accessibility thereto, and whereby the meter register may be located outside the house in any convenient position without regard to the position of the meter motor, and without any special precaution to protect the same from the weather.

A further object of the invention is to provide a means of the character aforesaid which may be securely and detachably connected with the meter motor and meter register, and so connected in a manner to permit the sealing of the separate parts in substantially the same manner as they would be sealed if installed as a unit.

An embodiment of the invention is illustrated in the accompanying drawing, in which:

Figure 1 is an elevation partly in section showing a water meter with an embodiment of my invention attached thereto.

Figure 2 is a fragmentary enlarged elevation of the meter casing partly in section, showing in vertical section my attachment connected thereto.

Figure 3 is a section taken on the line 3—3 of Figure 2.

Figure 4 is a top plan of the embodiment shown in Figure 2 with the cover members removed.

Figure 5 is a side elevation partly in section showing the connection of my attachment with the meter register.

Figure 6 is a rear elevation of the meter register.

Figure 7 is an enlarged end view of the connector for the register shaft.

Referring to the drawing in detail, the numeral 1 indicates generally a meter casing with the registering mechanism and housing removed therefrom, such removed housing and mechanism being indicated generally by the numeral 2. The meter thus shown is of the well known Trident type and includes in the lower part of the casing inlet and outlet ports 3 and 4 respectively, between which is located but not shown the usual measuring apparatus including means for rotating a drive shaft 5 which projects through a partition 6 extending transversely of the casing in spaced relation to the top thereof. The measuring apparatus and shaft rotating means per se form no part of the present invention, and are referred to herein as the meter motor. The registering mechanism is of usual construction operated by means of a shaft 7, and is referred to herein as the meter register.

Supported in the upper part of the casing 1, above the partition 6, is a supporting plate 8 for the reduction gears 9 and 10. Preferably the plate 8 is substantially in the form of a disk having a depending annular flange 11 seated on some substantial part of the casing such as the ledge 12 which supports the partition 6. The plate 8 is formed with spaced openings 13 and 14 which receive therein the hubs 15 and 16 formed on the gears 9 and 10 respectively. When the hubs are extended into the openings, the gears 9 and 10 are supported on the upper face of the plate 8.

Seated on the casing 1, above the supporting plate 8, is a cover plate 17, and seated on the cover plate is a closure member 18 substantially in the form of an inverted cup. The plate 17 and member 18 are provided at their peripheries with suitable means such as the recesses 19 for receiving the usual holding screws 20 which secure the plate 17 and closure member 18 to the casing. These members are secured to the casing in the same manner as the removed dial housing normally would be secured, and any means which would normally be resorted to to seal the dial housing to the casing may be employed for sealing the plate 17 and closure member 18 to the casing.

Formed with or rigidly secured to the upper face of the plate 17 is a nipple 21 with which is threadedly engaged a nut 22 swiveled on the rigid terminal portion 23 of a flexible housing 24. The closure member 18 is provided with an opening 25 through which the portion 23 of housing 24 extends, and when the closure member is secured in position upon the casing, any inadvertent or unauthorized tampering with the nut 22 is prevented. Extending through the flexible housing 24 is a flexible shaft or cable 26 which is provided at its end with a connector 27 extending through the nipple 21 and having a split free end portion receiving therein a bar 28 extending transversely across an opening through the center of the hub of gear 10. This split end portion extends through the plate 8 into the space between the plate and the partition 6. The drive shaft 5 is formed with a correspondingly split free end portion which receives therein a bar 29 extending transversely across an opening through the center of the hub of gear 9. The gears 9 and 10 are in mesh, and operatively connect the drive shaft 5 with the connector 27 on the flexible shaft 26.

Adapted to be detachably connected in any suitable manner to any desired support such as a building wall 30 is a supporting plate 31 for the register housing 2. The housing is secured to the plate by means of holding screws 32 similar to the screws 20, which extend through recesses 33 in the register housing and into the plate. The register housing is connected to the plate 31 in the same manner as it would normally be connected to the casing 1, and may be sealed to the plate in the same manner as it normally would be sealed to the casing.

Formed with or rigidly secured to the inner or rear face of the plate 31 is a nipple 34 which is threadedly engaged with a nut 35 swiveled on the rigid terminal portion 36 of the housing 24 at the opposite end thereof from the rigid portion 23. The flexible shaft 26 is provided at the end thereof opposite to the connector 27 with a rigid connector 37 which is of cylindrical form having a bar 38 extending transversely across the free end thereof. The free end portion of the register operating shaft 7 is split in the same manner as the free end portion of the drive shaft 5 in order that it may extend into the connector 37 on opposite sides of the bar 38.

The connector 37 is of greater diameter than the flexible shaft 26, whereby a shoulder 39 is formed at its point of connection with the shaft. At a point spaced inwardly or rearwardly from the shoulder 39, the terminal portion 36 of the flexible shaft housing is provided on its inner face with a shoulder 40. Disposed between the shoulders 39 and 40, in encircling relation to the flexible shaft 26, is a stop element 41 for abutment with the shoulders to prevent disengagement of the connector 37 from the shaft 7 so long as the flexible housing is connected with the plate 31. The stop element 41 may be in the form of one or more washers having a total thickness substantially equaling the space between the shoulders 39 and 40.

By employing an attachment as herein described, a meter casing and meter register may be located wherever desired without regard to the position of one with respect to the other. They may be at any required distance apart, and in entirely different planes, both vertically and horizontally. While the attachment is securely fastened to both the meter casing and register casing, it may be readily detached from either by anyone authorized to detach the same. By the extension of the connector 27 well through the gear 10 into the space between the supporting plate 8 and partition 6, the flexible shaft is provided with ample play for expansion or the like at its point of connection with the reduction gearing, such play, in connection with the stop element 41 and shoulders 39 and 40 co-operating to prevent any binding of the parts, and to prevent accidental disengagement of the attachment when properly connected with a meter. While the embodiment of the invention herein illustrated and described is intended as a practical and preferred example of the same, it is to be understood that such changes in the details of construction may be made as fall within the scope of the claims hereunto appended.

What I claim to be new, and desire to protect by Letters Patent, is:

1. In combination with a water meter casing having a meter motor in the lower part thereof, a transverse partition spaced from the top thereof, and a drive shaft operatively connected with the meter motor and having a split upper end portion extending through the partition; a supporting plate extending across the casing above said partition in spaced relation thereto and having a supporting flange depending therefrom and seated adjacent the partition, said plate having a pair of spaced openings, a pair of meshing gears seated on said plate and having hubs projecting into said openings, each of said hubs being formed with a central opening and having a bar extending transversely across the opening, one of said bars being connected with the split upper end portion of said drive shaft, a cover plate extending across the top of the casing and formed with an opening, a nipple secured to the upper face of said cover plate in registry with the opening therethrough, an inverted cup-shaped closure member seated on the cover plate and having an opening, means for securing the closure member and cover plate to the casing, a flexible housing having an end portion extending through the opening in the closure member, a nut swiveled on said housing and connecting the same with said nipple, a flexible shaft extending through the housing and having a rigid connector at one end projecting from the housing and extending through the opening in the cover plate, said connector having a split lower end portion connected with the other of said gear hub bars and extending into the space between said supporting plate and partition, and a meter register operatively connected with the other end of said flexible shaft.

2. In combination with a water meter casing having a meter motor in the lower part thereof, a transverse partition spaced from the top thereof, and a drive shaft operatively connected with the meter motor and extending through the partition; a supporting plate extending transversely of the casing above said partition in spaced relation thereto, said plate having a pair of spaced openings, a pair of meshing gears seated on said plate and having hubs projecting into said openings, one of said gears being connected with said drive shaft, a cover plate extending across the top of the casing and formed with an opening, an inverted cup-shaped closure member seated on the cover plate and having an opening, means for securing the closure member and cover plate to the casing, a flexible housing having one end extending through the opening in the closure member and secured to the cover plate in encircling relation to the opening therethrough, a flexible shaft extending through said housing and having a connector at one end connected with the other of said gears and extending into the space between the supporting plate and partition, and a meter register operatively connected with the other end of said flexible shaft.

3. In combination with a water meter casing having a meter motor in the lower part thereof, a transverse partition spaced from the top thereof, and a drive shaft operatively connected with the meter motor and extending through the partition; a rigid supporting member extending transversely of the casing above said partition in spaced relation thereto, a pair of meshing gears seated on said member, one of said gears being connected with said drive shaft, a cover plate extending across the top of the casing and having an opening, a flexible housing secured to the top of the cover plate, a flexible shaft extending through said housing and having at one end a connector extending through the opening in the cover plate and connected with the other of said gears, said connector extending into the space between said supporting member and partition, and a meter register operatively connected with the other end of the flexible shaft.

4. In combination with a water meter casing having a meter motor and an upwardly extending drive shaft operatively connected with the meter motor; a rigid supporting member extending transversely across the casing in spaced relation to the top thereof and having a pair of spaced openings, a pair of meshing gears seated on said member and having hubs projecting into said openings, one of said gears being connected with the drive shaft, a cover plate extending across the casing above said gears and having an opening, a flexible housing secured to the cover plate, a flexible shaft extending through said housing and connected through the opening in the cover plate with the other of said gears, and a meter register operatively connected with said flexible shaft.

5. In combination with a water meter casing having a meter motor provided with an upwardly extending drive shaft; a rigid supporting member extending transversely across the casing and having a pair of spaced openings, a pair of horizontally disposed meshing gears seated on said member and having hubs projecting into said openings, one of said gears being connected with the drive shaft, closure means for the top of the casing, a flexible housing having one end opening into the casing through said closure means, a flexible shaft extending through said housing and connected with the other of said gears, and a meter register operatively connected with said flexible shaft.

EDWIN J. H. LEININGER.